United States Patent [19]
Grider et al.

[11] Patent Number: 5,212,774
[45] Date of Patent: May 18, 1993

[54] TWO PROCESSOR COMMUNICATIONS SYSTEM WITH PROCESSOR CONTROLLED MODEM

[75] Inventors: Stephen N. Grider, Farmers Branch; Don Folkes, Coppell; Stephen M. Curry, Dallas; Wendell L. Little, Carrollton, all of Tex.

[73] Assignee: Dallas Semiconductor Corporation, Dallas, Tex.

[21] Appl. No.: 282,702

[22] Filed: Dec. 9, 1988

[51] Int. Cl.⁵ ................... G06F 9/00; G06F 13/14
[52] U.S. Cl. ..................... 395/200; 395/325; 364/229; 364/230; 364/238.5; 364/284; 364/286
[58] Field of Search ................. 379/98, 97; 364/200 MS File, 900 MS File; 395/200, 325

[56] References Cited

U.S. PATENT DOCUMENTS

| | | | |
|---|---|---|---|
| 4,417,304 | 11/1983 | Dinwiddie | 364/200 |
| 4,481,574 | 11/1984 | DeFino et al. | 364/200 |
| 4,484,306 | 11/1984 | Kulczyckyj et al. | 364/900 |
| 4,601,011 | 7/1984 | Grynberg | 364/900 |
| 4,695,946 | 9/1987 | Andreasen et al. | 364/200 |

Primary Examiner—Lawrence E. Anderson
Attorney, Agent, or Firm—Worsham, Forsythe, Sampels & Wooldrige

[57] ABSTRACT

Preferred embodiments include systems with two processors and an interconnected modem, one processor functioning as a control for both the modem and the second processor. This permits remote communication with the second processor for test or reconfiguration purposes.

15 Claims, 2 Drawing Sheets

PIN CONNECTIONS
| | | | |
|---|---|---|---|
| P1.0 | 1 | 40 | $V_{CC}$ |
| P1.1 | 2 | 39 | P0.0 AD0 |
| P1.2 | 3 | 38 | P0.1 AD1 |
| P1.3 | 4 | 37 | P0.2 AD2 |
| P1.4 | 5 | 36 | P0.3 AD3 |
| P1.5 | 6 | 35 | P0.4 AD4 |
| P1.6 | 7 | 34 | P0.5 AD5 |
| P1.7 | 8 | 33 | P0.6 AD6 |
| RST | 9 | 32 | P0.7 AD7 |
| RXD P3.0 | 10 | 31 | EA*/$V_{PP}$ |
| TXD P3.1 | 11 | 30 | ALE/PROG* |
| INT0* P3.2 | 12 | 29 | PSEN* |
| INT1* P3.3 | 13 | 28 | P2.7 A15 |
| T0 P3.4 | 14 | 27 | P2.6 A14 |
| T1 P3.5 | 15 | 26 | P2.5 A13 |
| WR* P3.6 | 16 | 25 | P2.4 A12 |
| RD* P3.7 | 17 | 24 | P2.3 A11 |
| XTAL2 | 18 | 23 | P2.2 A10 |
| XTAL1 | 19 | 22 | P2.1 A9 |
| $V_{SS}$ | 20 | 21 | P2.0 A8 |
FIG. 3
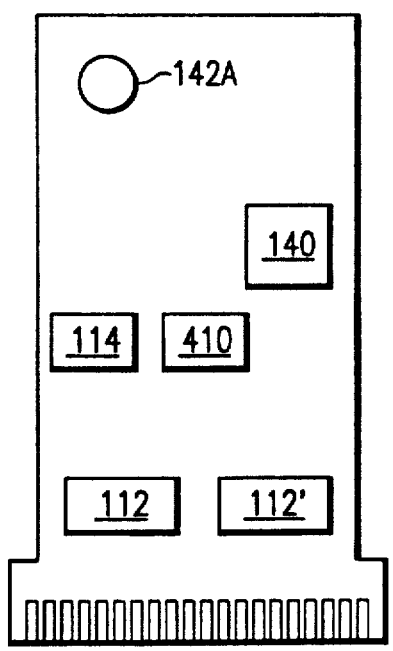
FIG. 4a
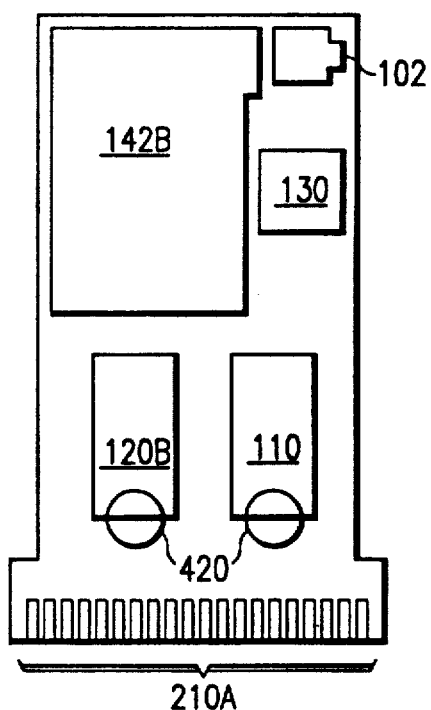
FIG. 4b

TWO PROCESSOR COMMUNICATIONS SYSTEM WITH PROCESSOR CONTROLLED MODEM

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent document or patent disclosure, as it appears in the United States Patent and Trademark Office patent file or records, but otherwise reserves all copyright rights whatsoever.

BACKGROUND AND SUMMARY OF THE INVENTION

The present invention relates to computer systems, and particularly to small computer systems which can be connected to a telephone line.

The present invention provides a computer system which can be completely reprogrammed by telephone. This permits debugging, or software updating, to be performed by telephone. Since low-level access is possible, this system can be used for data-collection stations, for application-specific systems generally, or for other systems in which a high-level software environment is not present.

Some presently available software packages permit a computer to be accessed, through a modem, in "slave" mode. In this mode, the user can issue commands, through the process which is managing the communications link, to be passed on to the main operating system (software). However, since this connection occurs at a fairly high level, it is not suitable for low-level manipulation of a microprocessor's programming. This means that access of this kind cannot reliably be used for troubleshooting.

It should also be noted that, in presently available modem systems, an "escape sequence" is commonly used to identify modem commands within a stream of data. That is, in common modem systems for use with desktop computers, the computer will send commands directed to the modem (such as "hang up") on the same line as the data which is to be sent through the modem to a remote computer. To prevent confusion, the "escape sequence" is used to indicate that the modem must interpret (rather than transmit) the following bits. For example, one commonly used escape sequence is three plus signs (+ + +), preceded and followed by a certain minimum period of silence.

The ability to perform "teleservicing" can be a significant element of a userfriendly computer system. A tremendous amount of effort has been devoted to providing "friendly," easy-to-use computer systems and software. However, one of the weak points in this effort is that, when problems occur, the inexperienced user may rapidly become bewildered and unhappy, regardless of how friendly the system is when it is working. Moreover, physical transportation of computer systems is a large burden on the time of users and/or technicians. Thus, it would be a major forward step if an experienced repair technician could access a customer's system by telephone, even if a hardware failure had occurred, and reliably read the configuration and state of the system and software, and change stored programs if needed.

This ability is also advantageous in many large-scale system design contexts. For example, if a systems analyst is formulating solutions to a problem which requires periodic data collection from many points, he may consider using human monitors; or using physical recorders (such as strip charts) with analog sensors; or using simple microprocessor or microcontroller systems to collect data in digital records; or use higher-level microcomputer systems which can collect data, reduce it, and transmit via modem on demand. In considering system architectures of this scale, one of the key parameters is how "smart" the remote station is: can it implement a sophisticated algorithm to control sensors? Can it monitor data storage conditions? Can it recognize exception conditions? Another key parameter is robustness: a "smart" remote station which fails can be much worse than a simpler station, since the extraordinary measures which may be needed to retrieve the data may disrupt the efficiency and economy of data flow overall. From this point of view, it may be seen that the present invention provides a range of options which would not otherwise be available.

For example, the present invention can be particularly advantageous with systems using fairly low-level control systems. Major home appliances (such as washing machines, driers, microwave ovens, etc.) usually contain embedded microcontrollers; the present invention can be particularly advantageous in such systems, since, with only a small increase in the cost of the embedded electronics, it may be possible to perform remote diagnosis on such systems. Similarly, such architectures can be adapted for diagnosis of consumer electronics systems, or even to retrieve billing information from pay-per-view cable systems (or utility-metering systems).

A further area of capability provided by the present invention is in redundant systems. The ability to perform low-level remote access means that, wherever the hardware system has included sufficient redundant elements and (electronically) switchable elements to bypass the failure, teleservicing can be used to select or deselect those elements. For example, a precision timing circuit can be retrimmed to compensate for drift in the crystal frequency; or, where a line interface chip has been blown by a voltage spike, that chip can be disconnected and another one connected; or power transistors, protection diodes, electrolytic capacitors, disk drives, memory banks, etc., can be similarly switched. The capability to test and reconfigure a remote system may be particularly advantageous where high reliability and maintainability are needed.

The capabilities of the disclosed system can be advantageous in a wide variety of systems. A few examples—which do not by any means exhaust the range of applications of the disclosed innovative concepts—include private branch exchanges (PBXs); vending machines (including machines which can accept credit cards for payment); automated machine tools and robotic systems, where the compatibility provided by the present inventions may permit a large step to be taken toward an integrated manufacturing environment, without users to install a comprehensive new computer network; process controllers, for a wide variety of continuous processes, including chemical plants, oilfield production sites, food-processing operations, and others;

printing presses; information presentation systems; semiconductor manufacturing equipment (where systems according to the present invention are particularly advantageous in keeping humans out of the clean room).

Another class of applications uses a basic system, like that shown in FIG. 1, simply as an entry point to a more complex system. Thus, a configuration where the target microcontroller is connected to a further microprocessor (or other computer) can be used to provide low-level management functions (power-up, watchdog, kickstarter, clock, etc.) for a digital signal processor (DSP) system, or for a 32-bit microprocessor-based computer, or even for a minicomputer or mainframe. Alternatively, such a configuration can be used simply for system robustness; by permitting the nonvolatile target microprocessor to perform low-level tests on the more complex elements of the system (and, optionally, also permitting the nonvolatile microprocessor to control configuration switch settings), extensive teleservicing of even a complex system can become possible. A further alternative is to use the nonvolatile target microprocessor to monitor system activity, and to dial out and report hardware or software failures (or major events).

The presently preferred embodiment enables a telephone-programmable computer by providing a module which combines a DS5000T Time Microcontroller ™ (which includes clock/calendar functions) with a 1200 bps or 2400 bps modem and another DS5000 microcontroller, and 32 Kbytes of nonvolatile SRAM (which can be used for program and/or data). A ribbon cable and connector is provided, so that this module can be connected to a standard DS5000/8051 socket on a circuit board.

The systems and subsystems provided by the present invention, and/or by alternative embodiments thereof, have at least the following advantages:

Teleservicing is possible, in new designs or existing systems;

Complete application software changes can be made with only telephoneline access;

capability to download and verify absolute object files (in Intel Hex);

All DS5000T I/O facilities available to the user, and familiar modem functions can also be exploited.

Requires no support circuit overhead on target system.

BRIEF DESCRIPTION OF THE DRAWING

The present invention will be described with reference to the accompanying drawings, which show important sample embodiments of the invention and which are incorporated in the specification hereof by reference, wherein:

FIG. 3 shows the preferred pin allocation of the socket 212 in the target system.

FIGS. 4a and 4b show the general circuit board organization of the presently preferred embodiment.

DESCRIPTION OF THE PREFERRED EMBODIMENTS

Figure 1:
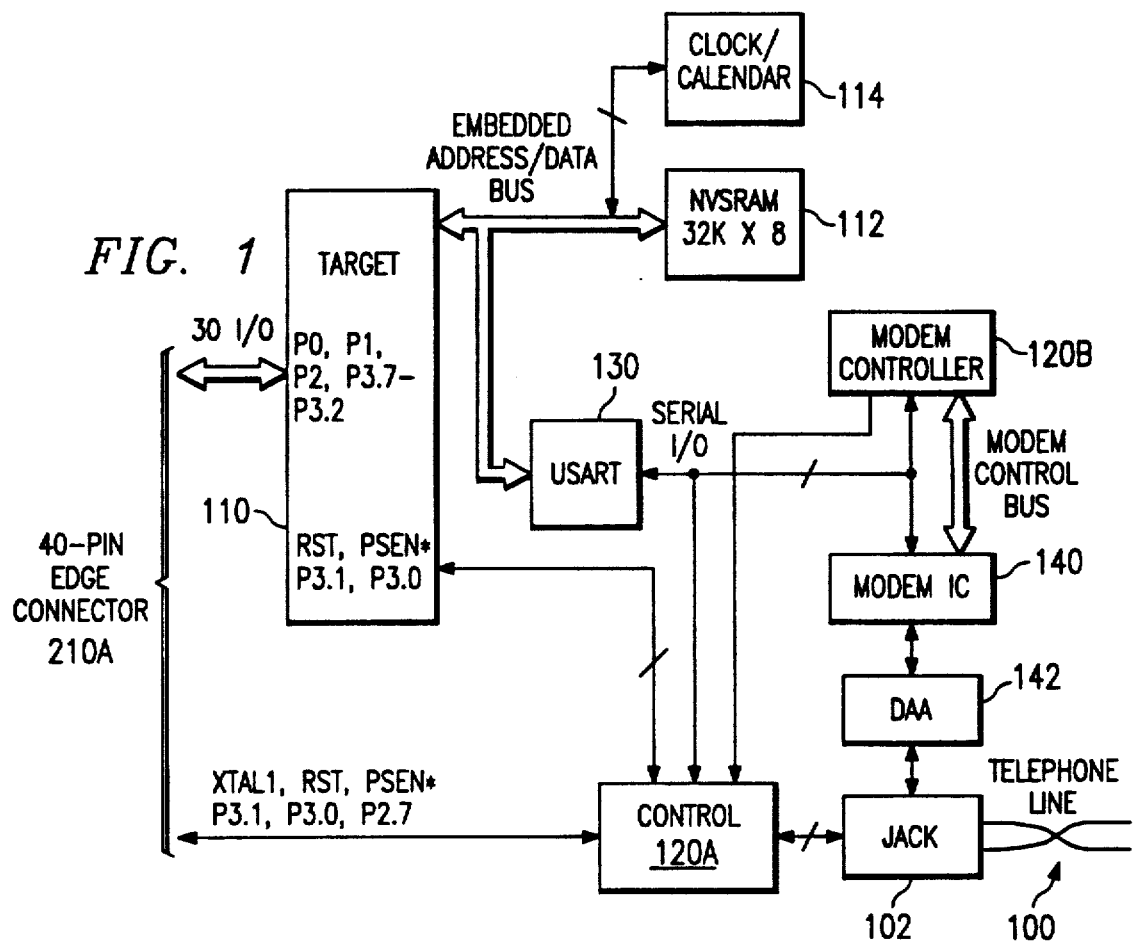
FIG. 1 is a block diagram which illustrates the functional elements of the module which, in the presently preferred embodiment, provides telephone-line direct access to a computer system.

The numerous innovative teachings of the present application will be described with particular reference to the presently preferred embodiment, wherein these innovative teachings are advantageously applied to a system using two DS5000 nonvolatile microprocessors. However, it should be understood that this embodiment is only one example of the many advantageous uses of the innovative teachings herein.

The presently preferred embodiment is particularly directed to systems which are based on the DS5000T Time Microcontroller. (This microcontroller is a modification of the DS5000 referred to above, which includes a real-time clock/calendar in addition to the other functions of the DS5000.) Teleservice refers to the ability to perform remote software upgrades and system diagnostics from a desktop computer over a telephone line. The major benefit to the end user is reduced operating costs by eliminating service calls to repair or upgrade equipment in the field.

A central part of the TeleMicro Cartridge is the DS5000T itself. Unlike rigid ROM or EPROM based microcontrollers, all of the Time Microcontroller's memory is high performance, read/write, and nonvolatile for more than 10 years. The DS5000T is equipped with 32K bytes of nonvolatile SRAM which can be dynamically partitioned to fit program and data storage requirements of a particular task. A major benefit resulting from its nonvolatility is that the Time Microcontroller allows Program Memory to be changed at any time, even after the device has been installed in the end system. Additionally, the size of the Program and Data Memory areas in the embedded RAM is variable and can be set when the application software is initially loaded or by the software itself during execution. Incorporated within the DS5000T is a permanently powered clock/calendar function which may be used for time stamping and scheduling of events. The DS5000T is instruction set and pin compatible with the industry standard 8051.

The TeleMicro Cartridge exploits this capability of the DS5000 with the addition of a complete modem subsystem which resides on the Embedded Address-/Data bus of the DS5000T. The subsystem accepts the "AT" command set issued from the user's software for maximum customer familiarity during software development. The internal circuitry includes a Part 68 registered DAA function, eliminating potential delays for customers with a need to incorporate a modem function in their end system product. The microcontroller 110 is interfaced to the modem subsystem via its Embedded Address/Data bus, so that all of its 40 pins are available for use in the target application.

The TeleMicro Cartridge is housed in a rugged and durable package which is compact enough to fit into a wide variety of applications. Two connectors are provided on the cartridge. The first is an RJ45 female connector which interfaces directly to the telephone line terminated with a standard modular RJ11 male connector. The second is a 40-pin edge connector which brings out the signals associated with the footprint of a DS5000 or 8051. A standard 40-pin connector may be used for direct mount to a printed circuit board. Alternatively, remote mounting may be accomplished with a 40-conductor ribbon cable terminated with a 40-pin DIP plug. The remote method can be used to retrofit existing systems which have a DS5000 or 8061 socket.

FIG. 1 is a block diagram which illustrates the functional elements of the TeleMicro Cartridge of the presently preferred embodiment. There are actually two microcontrollers incorporated within the design. The first (microcontroller 110) is, in the presently preferred embodiment, a DS5000T which is used to execute the user's application software. This is referred to as the target microcontroller 110. All of the facilities of the target microcontroller 110 are available for use in the application including the clock/calendar, 32K bytes of nonvolatile Program/Data RAM, serial I/O, parallel I/O, timers, and interrupt facilities.

The second microcontroller in the system is a DS5000 which performs all of the modem housekeeping functions and recognizes Hayes TM AT commands issued from the targer (or user's) microcontroller 110. In addition, this DS5000 (hereinafter referred to as the modem controller 120) controls the serial loading of the target microcontroller 110 from over the phone line. As a result, the entire Embedded RAM area of the target microcontroller 110 may be completely reloaded from scratch over the telephone line. This allows all of the application software and data tables within the RAM to be maintained from a remote host computer, such as an IBM PC.

Additional detail regarding the DS5000 microprocessors used in the presently preferred embodiment may be found in product literature of Dallas Semiconductor Corp., and in the following applications, all of which are hereby incorporated by reference: Ser. No. 023,433, Filed Mar. 9, 1987; Ser. No. 238,809, Filed Aug. 31, 1988; Ser. No. 166,383, Filed Mar. 10, 1988; Ser. No. 164,185, Filed Mar. 4, 1988; and Ser. No. 232,403, Filed Aug. 15, 1988. (The DS5000 and DS5000T integrated circuits, and their data sheets and user's guide, are available from Dallas Semiconductor Corporation, 4350 Beltwood Parkway, Dallas Tex. 75244, are all hereby incorporated by reference.)

Figure 2:
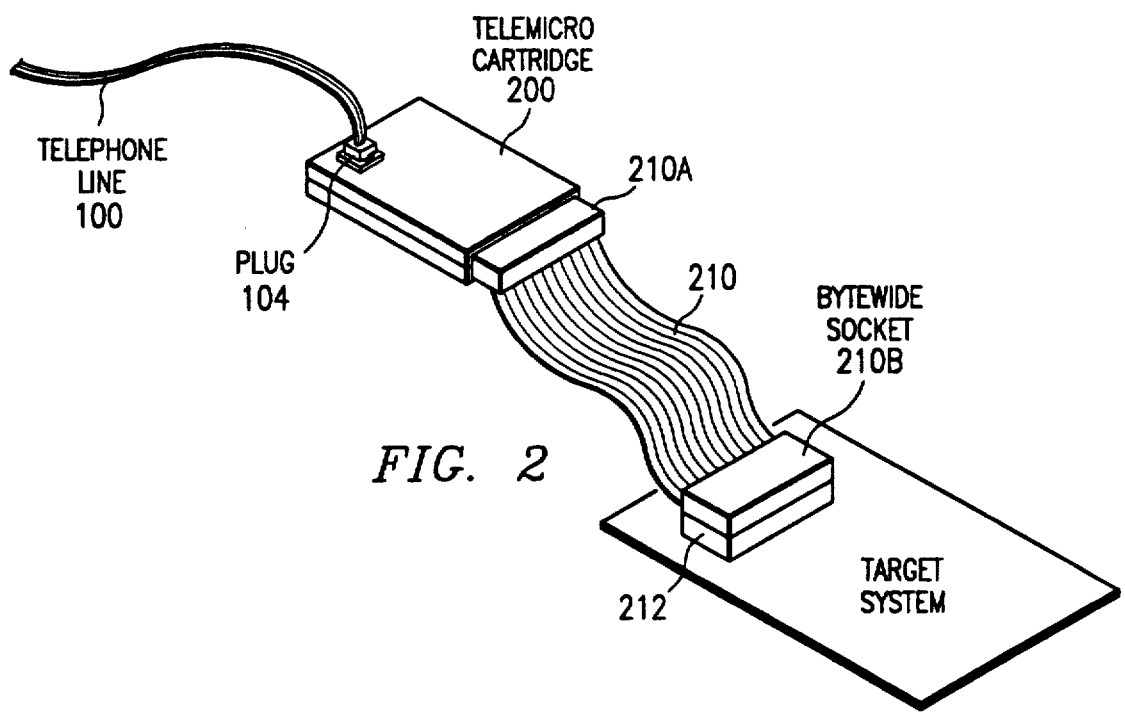
FIG. 2 shows the physical connection of the TeleMicro cartridge of the presently preferred embodiment into a socket on a board of a target computer system.

The present invention enables a TeleMicro Cartridge, as shown in FIG. 2, which can be plugged in in place of the microprocessor in a target system and bring instant teleservice capability to the system. The TeleMicro Cartridge 200 connects to telephone line 100 via RJ45 Jack 102 and RJ11 plug 104. The TeleMicro Cartridge 200 also connects, in the presently preferred embodiment, to the 40-pin socket 212 in the Target System, which has a pinout as shown in FIG. 3, through a connecting cable 210, which includes a 40-pin plug 210B to mate to socket 212 at one end and an edge connector 210A at the other end.

The RJ45 also provides an additional capability, which can be used to facilitate rapid program loading. The RJ45 has 8 pins, but not all of these are normally used for telephone service.

In this alternative embodiment, the second microcontroller, which controls the modem functions, can be loaded by way of an RJ45 jack (connected to a PC). The RJ11 jack of the phone line usually consists of four lines, two of which are the active TIP and RING signals. The RJ45 connector includes 8 lines. The RJ11 phone jack plugs into the RJ45 connector on the TeleMicro Cartridge, and uses only the center four lines, leaving the outer four lines floating. When the modem controller needs to have its software reloaded, the phone line RJ11 jack is disconnected, and an 8 line RJ45 jack is connected. The RJ45 jack only uses the outer four lines of the jack, floating the phone connections when inserted. Two of the lines are used for RS232 transmit and receive signals. One line is a no-connect, and the last line is the control line for placing the modem controller in a reload mode. The reload data is sent on the RS232 lines from a PC. When the RJ45 jack is removed, the modem controller switches out of the reload mode, and executes the modem program. The RJ11 phone jack is then reinserted in the RJ45 connector, and modem communications can be resumed.

Most of the pins of the 40-pin connection are connected directly to the target microcontroller 110. However, some important lines are intercepted by the modem controller, including the XTAL1, RST, PSEN*, P3.1, P3.0, and P2.7 pins. FIG. 1 shows control logic 120A separate from modem controller 120B; normally these separate elements are packaged together in a single microcontroller, but, in the presently preferred embodiment, these elements are separated. Similarly, the memory 112 and clock/calendar 114 are normally integrated in a common package with the target microcontroller 110, but these elements are shown separately in FIG. 1. Similarly, the DAA interface 142 is often integrated in the same package with the modem 140, but is mounted separately in the presently preferred embodiment.

The 82C50 USART 130 is used for serial data transfers from the target microcontroller 110 when connection is established with a remote computer over the telephone line. In addition, when a connection is not established and the modem is in the command mode, the USART is used for communication between the target microcontroller 110 and the modem controller. In this manner, a Hayes-compatible interface is established on the target microcontroller 110's Embedded Address-/Data Bus.

The DAA 142 provides a "direct connect" interface to a telephone line. It is FCC Part 68 Type WP registered to meet hazardous voltage, surge and leakage current requirements. A system developed with this product as the DAA meets Part 68 Type WP protection requirements and requires no further registration. The DAA is also CD-03 approved for the Canadian public switched telephone network.

In normal operation, the modem subsystem performs the functions required according to the "AT" commands which are issued to it from the target microcontroller 110. The microcontroller 120 in the modem subsystem takes on the additional responsibility of reloading the target microcontroller 110 under certain specific conditions. In these cases, the modem automatically establishes connection with the host and places the target microcontroller 110 in its Serial Load Mode. During this time, the modem subsystem isolates signals on the target microcontroller 110 which are used to accomplish the serial download task from the target system circuitry. This includes RST, PSEN*, XTAL1, TXD (P3.1), RXD (P3.0) and P2.7. RST is first driven high to initiate a reset within the target microcontroller 110. Following this action, XTAL1 should be driven by a frequency found in the table below, unless the SW1 switch is thrown (which ties the XTAL1 pin to the on-board 11.059 MHz clock oscillator). Finally, PSEN* is then driven low. This sequence of actions causes the target microcontroller 110 to begin operation in its Serial Program Load Mode at a clock frequency from which 1200 bps can be derived. Communication between the host computer and the DS5000 via its RXD and TXD pins is established. During this time, P2.7 of the target microcontroller 110 is floated to prevent it from being inadvertently forced into a Parallel Load Verify Cycle.

| STANDARD BAUD RATE CLOCK FREQUENCIES (MHz) | |
| --- | --- |
| 12.000 | 6.000 |
| 11.059 | 5.990 |
| 11.000 | 5.069 |
| 9.216 | 4.608 |
| 7.373 | 1.843. |

None of the activity on the RST, TXD, RXD, XTAL1, P2.7 pins is driven out to the target system lines while the modem is controlling the reloading process. During this time, the target microcontroller 110 appears to be in a reset condition to the target system.

Of course, it must be understood that the specific pin and packaging configuration given here is merely illustrative, and is provided only to better illustrate the best mode of the invention as presently contemplated.

FIG. 4 shows top and bottom views of the preferred board layout of the module, in the presently preferred embodiment. In addition to the elements referred to above, note that the back-up batteries 420 are shown for the two microcontrollers 110 and 120, and that an RS232 transceiver 410 is also shown. In addition, note the DAA circuitry 142 is actually positioned in two locations: the DAA protection circuitry 142A is separate from the rest of the DAA (142B).

AT COMMANDS: The only software which is provided in the TeleMicro cartridge is that which is resident in the modem subsystem's microcontroller 120. During normal operation, this DS5000 manages the modem integrated circuit, and communicates with the target microcontroller 110 via "AT" commands issued from the target microcontroller 110 over the USART's serial I/O lines.

EXTENDED COMMANDS: There are a number of commands which have been added to the base AT command set in the TeleMicro Cartridge's internal modem. These additional functions are outlined as follows:

Nn—Number to Memory Register: This command may be used to write a telephone number or dialing sequence into one of the 10 nonvolatile memory registers. Each register (designated 0-9) can accept a maximum of 126 entries. The command must include the register destination number, e.g. "N1" stores the following character string into register number 1. Each string entered must be terminated with a carriage return. into register number 1. Each string entered must be terminated with a carriage return. Similarly, the "N2" command causes a specific dialing sequence to be stored in Memory Register 2. The 10 memory registers are nonvolatile, so that they are completely retained in the absence of $V_{cc}$ voltage.

Pn—Print Contents of Memory Register: The P command will cause the modem to transmit the contents of the specified memory register. For example, the command P2 can be defined to cause the string DT9,5552287,#289; to be returned, assuming the N2 command was executed as above.

n—Dial from Memory Register: The "#" command is used to execute a command string from one of the nonvolatile memory registers. For example, the command #2 will cause the modem to use tone dialing to access a number outside of a PBX, pause before dialing, dial the number 5552287, pause, and then issue the PBX transfer code #289.

The modem with the TeleMicro Cartridge provides the capability to have automatic log-on character sequences stored in one of the 10 available Memory Registers. There are several commands associated with the auto log-on feature. These commands are summarized below:

$ Designates beginning and end of auto log-on strings.
Stop and wait for prompt from the host computer.

The following is an example of a Memory Register whose contents include an auto log-on string: ATDT9W5552344$#<CR>#ACCOUNT#PASSWORD$ In this example, the modem is programmed to tone dial 9 followed by a wait on second dial tone. Once the dial tone is detected, the phone number "5552344" is dialed. The "$" signifies that an auto log-on character sequence follows. In this case, the modem first waits for a host request (#). Once this is received, a carriage return character (<CR>) is issued and the modem waits for another host request. Additional information is sent when prompted by the host computer, such as the appropriate account number and password. The auto log-on character sequence is terminated by a second $ command.

The modem within the TeleMicro Cartridge has the capability to retain the "S" registers as nonvolatile data. These registers are used by the modem to hold configuration and operation parameters. In a normal "AT" compatible modem, the S registers are set to their default parameters following a power-on or reset. If nonvolatile operation is desired, then a value of 170 should be written to register S15.

The host computer can cause the modem controller to take action to force the target microcontroller 110 into its Serial Loader mode using the hardware mechanism described above. This would be done when the host computer needs to perform a complete reload of the application software into the target microcontroller 110. Alternatively, this same action might be taken in a case where the target microcontroller 110 does not respond to communication from the host computer after the modem controller automatically answers the host's call.

In order to perform this operation, the host computer must issue a special "escape sequence" of three ASCII "###". This three character sequence must be preceded and followed by a one second pause. Whenever the modem controller detects this sequence it will request a password string from the host with the following prompt:
password:
The host must then issue a character string which must match the one which was initially stored in the modem controller's nonvolatile SRAM. The password string can contain from 1-11 characters, and must be terminated with a carriage return. Once the password has been correctly entered, the modem controller will force the target microcontroller 110 into its Serial Loader mode and will establish communication between it and the host computer. At this point the host computer is communicating directly with the target microcontroller 110's Serial Loader. Application software can then be loaded into the target microcontroller 110.

Incorrect passwords will cause the TeleMicro Cartridge to respond with prompt "RUNNING". To enter another password, the "###" sequence must be resent.

When the Serial Load operation is complete, the host computer will then issue another escape sequence of three ASCII "$$$" which again must be preceded and followed by a one second pause. When this sequence is detected, the modem controller will allow the target microcontroller 110 to restart execution of its application program.

Both of these special escape sequences can only be issued from the host computer in order for them to be recognized by the modem controller. In addition, the "###" will cause no action in the modem controller if it is issued while the target microcontroller 110 is already in its Serial Load mode. Similarly, the "$$$" sequence will cause no action in the modem controller it if is issued while the target microcontroller 110 is executing its application software.

The initial password string which is recognized by the TeleMicro Cartridge when it is shipped from the factory is the string "password". This string can be modified by the host computer at the time when the old password is entered by supplying a new password as an optional argument. Syntax for this operation is summarized below:

password: old password[/new password]

When this character string is entered, the modem controller will request a confirmation of the new password from the host computer as follows:

confirm: new password

An example of this entire sequence would be performed as follows:

password: password/dallas
confirm: dallas

At this point, the originally programmed password string of "password" will have been changed to "dallas".

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, in addition to the password protection referred to, it may also be useful to include a module address selection protocol, so that a dial-up access could select one of several modules. This would permit multiple modules to be connected in parallel to a single phone line. (Of course, it would be necessary to maintain a reasonable input impedance, e.g. by using high-impedance inputs to several of the modules.

As will be recognized by those skilled in the art, the innovative concepts described in the present application can be modified and varied over a tremendous range of applications, and accordingly their scope is not limited except by the allowed claims.

What is claimed is:

1. An adapter module, for interfacing to a computer system which includes a microprocessor emplacement of a predetermined pin-out configuration, comprising:
a connector which matches said predetermined pin-out configuration;
a first microprocessor, which is compatible with the computer system architecture, and which has at least some data pins connected directly to said connector;
a modem, connectable to a serial input;
a second microprocessor,
connected with and to control said modem, and
connected to intercept at least some control signals received through said connector, and to provide said first microprocessor with selectably modified control signals in place thereof;
memory space, connected to said first microprocessor so that said first microprocessor can execute programs stored therein; wherein said second microprocessor is also able to read from and write to said memory space.

2. A computer system, comprising:
a first microprocessor with input and output connections;
a modem, connectable to a serial input;
a second microprocessor,
connected with and to control said modem, and
connected to said first microprocessor in such relation that said second microprocessor can force said first microprocessor to load a new program;
wherein said second microprocessor is connected to screen attempted program-load accesses to said first microprocessor with reference to a password which is stored in alterable nonvolatile memory.

3. The system of claim 2, wherein said second microprocessor can reset said first microprocessor.

4. The system of claim 2, wherein said second microprocessor can issue an interrupt command to said first microprocessor.

5. The system of claim 2, further comprising at least 5000 bits of rewritable nonvolatile memory.

6. The system of claim 2, further comprising at least 5000 bits of battery-backed rewritable nonvolatile memory.

7. The system of claim 2, further comprising at least one battery, connected to retain logic states in said second microprocessor.

8. A computer system, comprising:
a first programmable processor with input and output connections;
a modem, connectable to a standard telephone line;
a second programmable processor,
connected with and to control said modem, and
connected to said first processor in such relation that said second processor can force said first processor to load a new program;
wherein said second processor can abort programs running on said first processor, and can reprogram said first processor, regardless of the state of said first processor.

9. The system of claim 8, wherein said second processor is connected to screen attempted program-load accesses to said first processor with reference to a password which is stored in alterable nonvolatile memory.

10. The system of claim 8, wherein said second processor can reset said first processor.

11. The system of claim 8, further comprising at least 5000 bits of rewritable nonvolatile memory.

12. The system of claim 1, further comprising at least one battery, connected to retain logic states in said second processor.

13. The system of claim 1, wherein said second processor can issue an interrupt command to said first processor.

14. The system of claim 1, wherein said second processor has read and write access, at least indirectly, to substantially all of the program memory of said first processor.

15. The system of claim 1, wherein said second processor has read and write access to all of the program memory of said first processor.

* * * * *